US006393682B1

(12) United States Patent
O'Kane

(10) Patent No.: US 6,393,682 B1
(45) Date of Patent: May 28, 2002

(54) SPRING LOADED MUD FLAP INSTALLATION TOOL

(76) Inventor: Donald L. O'Kane, 11938-63 Street, Edmonton Alberta (CA), T5W 4G3

( * ) Notice: Subject to any disclaimer, the term of this patent is extended or adjusted under 35 U.S.C. 154(b) by 0 days.

(21) Appl. No.: 09/605,820

(22) Filed: Jun. 26, 2000

(51) Int. Cl.$^7$ .................................................. B23P 19/04
(52) U.S. Cl. .............................. 29/227; 29/256; 29/263
(58) Field of Search .......................... 29/227, 266, 259, 29/261, 258, 263, 256

(56) References Cited

U.S. PATENT DOCUMENTS

| | | | | |
|---|---|---|---|---|
| 646,008 A | * | 3/1900 | Neale | 29/261 |
| 1,862,172 A | | 6/1932 | Bennett | |
| 1,986,093 A | | 1/1935 | Abernathy | |
| 3,087,706 A | | 4/1963 | Van Der Wilt | |
| 3,178,808 A | | 4/1965 | Pendley | |
| 4,059,883 A | * | 11/1977 | Osborne | 29/259 |
| 4,603,461 A | | 8/1986 | Whippie et al. | |
| 4,648,165 A | | 3/1987 | Whitehorne | |
| 4,870,737 A | | 10/1989 | Navaro | |
| 4,930,751 A | | 6/1990 | Hutchins | |
| 4,976,022 A | | 12/1990 | Thornton | |
| 5,165,154 A | | 11/1992 | Miller | |
| 5,477,598 A | | 12/1995 | Borner | |

FOREIGN PATENT DOCUMENTS

| | | |
|---|---|---|
| FR | 570883 | 5/1924 |
| FR | 848992 | 11/1939 |
| IT | 448693 | 5/1949 |

* cited by examiner

*Primary Examiner*—Robert C. Watson
(74) *Attorney, Agent, or Firm*—David S. Thompson

(57) ABSTRACT

A spring loaded mud flap tool (10) includes a hook element (20) carried by one a first of a drive rod (30). The hook end of the hook element is sized to grasp the end of the spring carried within the hanger tube of the mud flap assembly. A handle assembly (80) is carried by a second end of the drive rod. The handle assembly allows the user to manipulate the hook until it successfully grasps the spring. A bearing assembly (40) is carried on the threaded surface of the drive rod (30), and supports a pair of diametrically opposed crank handles (70). In operation, the bearing assembly rests on the open end of the hanger tube. Revolution of the crank handles turns the drive rod, which retracts the hook element and therefore retracts the spring. The force of the spring pulling the tool (10) into the hanger tube is offset by an equal force exerted by the bearing assembly on the rim of the hanger tube. A safety chain (90) connects the hanger tube and the bearing assembly.

1 Claim, 4 Drawing Sheets

SPRING LOADED MUD FLAP INSTALLATION TOOL

CROSS-REFERENCES

There are no applications related to this application filed in this or any foreign country.

BACKGROUND

A spring loaded mud flap hanger is a device used on large trucks and trailers to hold mud flaps in their optimum position. Upon impact, the mud flap pivots, thereby expanding the spring. When the obstruction passes, the spring moves the mud flap back to its original position.

A spring loaded mud flap hanger consists of an anchor, hollow support arm or hanger tube, spring and spring retaining bolt. The anchor is bolted to the frame of the truck or other suitable support. A first end of the hanger tube is carried against the anchor. A bracket, carried by the hanger tube, supports the mud flap.

A first end of the spring is also attached to the anchor. A typical spring is 5/16 inch expansion type spring under a tension of 800 lbs. The second end of the spring is attached to a retainer bolt which is supported by diametrically opposed holes on either side of the second end of the hanger tube.

Primarily due to the tension of the spring, the spring loaded mud flap assembly is sold as an assembled unit, and is easily installed by bolting the anchor to the frame or other supporting surface of the truck.

Due to the nature of the spring, it is very difficult to repair a spring loaded mud flap. Such a repair would be indicated where the spring has over time been overly stretched, resulting in a mud flap which is too easily pushed backwardly, and which therefore assumes the wrong position during travel. Unfortunately, a cost-effective tool and associated method for repairing spring loaded mud flaps is not known.

For the foregoing reasons, there is a need for a spring loaded mud flap installation tool that can elongate a fresh replacement spring sufficiently to hook the second end to the retainer bolt without danger to the operator or damage to any of the mud flap or truck components. The tool should allow quick and easy spring replacement, and should result in an economic savings over replacement of the entire mud flap assembly.

SUMMARY

The present invention is directed to an apparatus that satisfies the above needs. A novel spring loaded mud flap installation tool is disclosed that can elongate a fresh replacement spring sufficiently to hook the second end to the retainer bolt without danger to the operator or damage to any of the mud flap or truck components. The tool allows quick and easy spring replacement, and results in an economic savings over replacement of the entire mud flap assembly.

The spring loaded mud flap installation tool of the present invention provides some or all of the following structures.

(A) A hook element is sized to reach into the hanger tube of the mud flap assembly and to grasp the end of the spring.

(B) A drive rod is externally threaded and of a diameter sized to pass into the hanger tube. A lower end of a drive rod supports the hook element.

(C) A bearing assembly is carried by the threaded surface of the drive rod. In operation, the lower retainer of the bearing assembly rests, without rotation, on the rim of the opening of the hanger tube of the mud flap assembly. Rotation of a threaded body within the bearing assembly retracts the drive rod, hook element and the spring. When sufficiently retracted, the second end of the spring can be secured to the retainer bolt carried by the hanger tube.

(D) A pair of crank handles extend from diametrically opposed sides of the threaded body of the bearing assembly. Rotation of the crank handles rotates the threaded body within the bearing assembly, thereby moving the drive rod with respect to the bearing assembly.

(E) A handle assembly extends from an upper end of the drive rod, and allows manual manipulation of the drive rod and hook element in a manner that makes possible connection of the hook with the end of the spring.

(F) A safety chain can be used to attach the bearing assembly to the hanger tube.

It is therefore a primary advantage of the present invention to provide a novel spring loaded mud flap installation tool that allows replacement of overly stretched springs within a spring loaded mud flap in a rapid and economical manner.

Another advantage of the present invention is to provide a novel spring loaded mud flap installation tool that is economical to manufacture and durable in use.

A still further advantage of the present invention is to provide a novel spring loaded mud flap installation tool that is safely operated, and which provides a safety chain which prevents the tool from rapid movement in the event that the spring retracts unexpectedly.

DRAWINGS

These and other features, aspects, and advantages of the present invention will become better understood with regard to the following description, appended claims, and accompanying drawings where:

FIG. 1, prior art, is a cross-sectional view of a spring loaded mud flap assembly, showing the spring carried within the hanger tube.

DESCRIPTION

Figure 1:
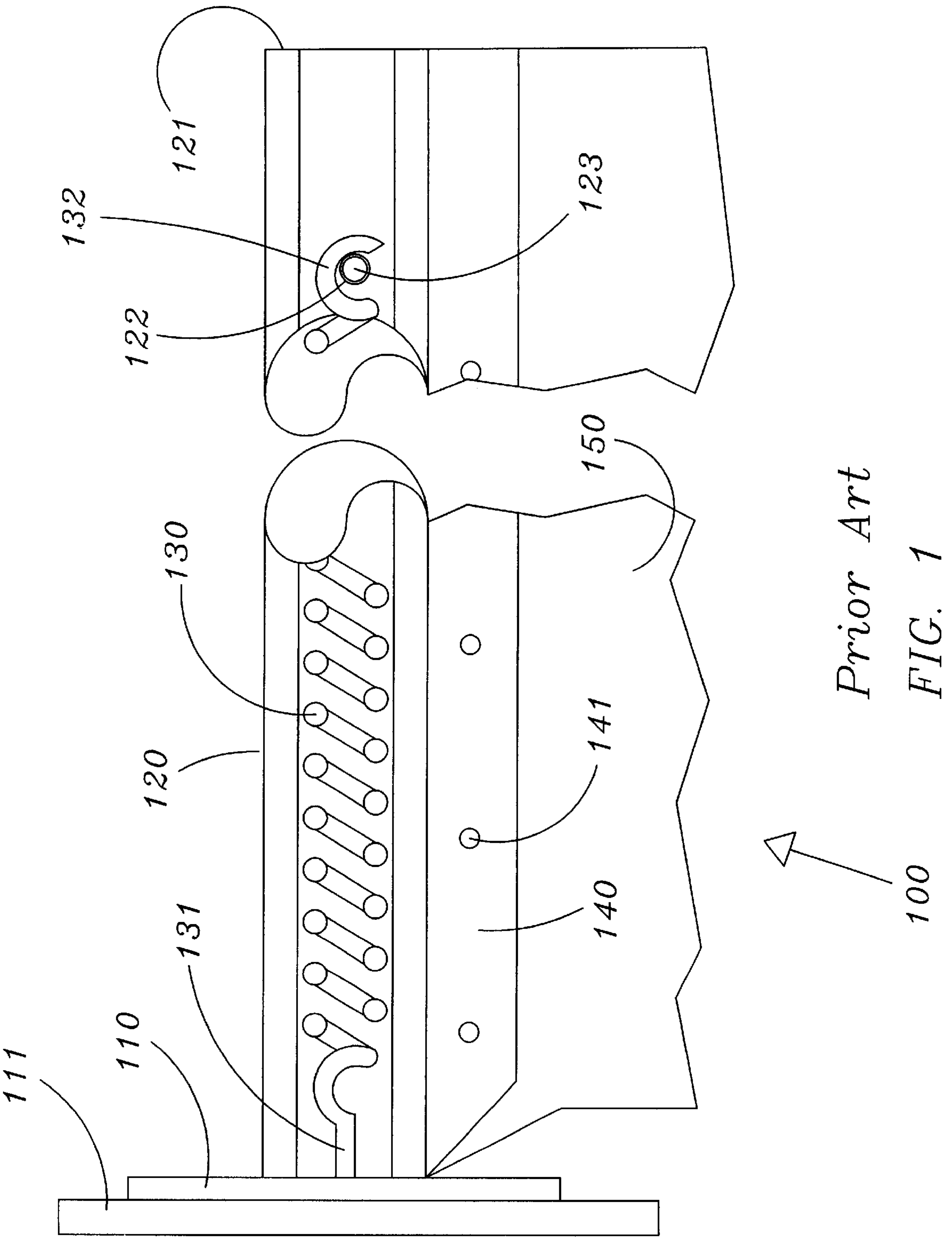
Prior Art FIG. 1

Referring in generally to FIGS. 1 through 6, two versions of a spring loaded mud flap tool 10 constructed in accordance with the principles of the invention is seen. A hook element 20 is carried by one end of a drive rod 30. The hook end of the hook element is sized to grasp the end of the spring carried within the hanger tube of the mud flap assembly. A handle assembly 80 is carried by the other end of the drive rod. The handle assembly allows the user to manipulate the hook until it successfully grasps the spring. A bearing assembly 40 is carried on the threaded surface of the drive rod 30, and supports a pair of diametrically opposed crank handles 70. In operation, the bearing assembly rests on the open end of the hanger tube. Revolution of the crank handles turns the drive rod, which retracts the hook element and therefore retracts the spring. The force of the spring pulling the tool 10 into the hanger tube is offset by an equal force exerted by the bearing assembly on the rim of the hanger tube. A safety chain 90 connects the hanger tube and the bearing assembly.

Referring to FIG. 1, the construction of a typical mud flap assembly 100 may be understood. An anchor 110 may be mounted on the frame 111 of the truck or any other suitable location. The hanger tube 120 is a hollow tube having a length that is slightly longer than the width of the mud flap to be supported. The hanger tube extends perpendicularly from the anchor. A second end of the hanger tube is open, having a rim 121. A hole 122 is defined on each side of the hanger tube, adjacent to the open rim 121, for passage of a retainer bolt 123.

The spring 130 carried within the hanger tube is an expansion spring, i.e. it resists the elongation and twisting which results when the flap 150 is moved backwardly. Such movement by the mud flap will result, for example, when a rock is thrown by the tire in front of the mud flap. A base 131 end of a spring 130 is attached to the anchor 110. A hooked end 132 on the opposite end of the spring is sized for attachment to the retainer bolt 123 carried at the end of the hanger tube.

A bracket 140 is carried by a lower edge of the hanger tube 120. A plurality of fasteners 141 attach the mud flap 150 to the bracket.

In operation, movement of the mud flap therefore moves the bracket 140 and tends to rotate the hanger tube. This movement is resisted by the spring 130. Over time, the spring becomes overly stretched due to the periodic absorption and release of energy. As a result, in the prior art, the entire assembly 100 is replaced due to failure of the spring only.

Figure 3:
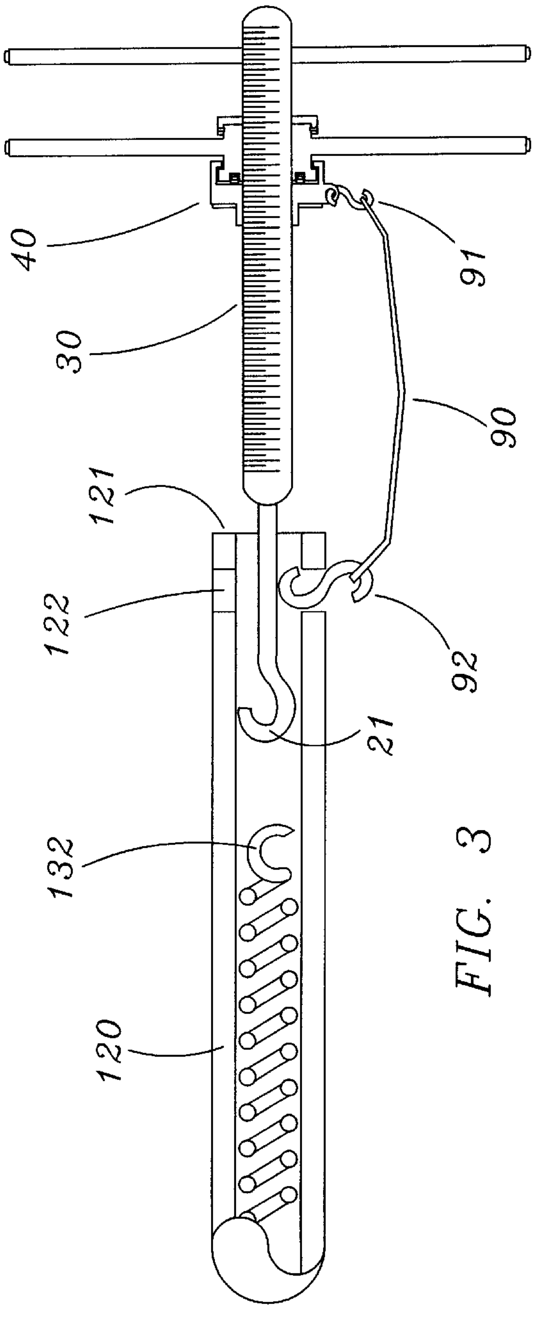
FIG. 3 is a side partial cross-sectional view of the a version of the spring loaded mud flap tool having a more complex bearing structure, illustrating the hook element extending within the hanger tube.
Figure 4:
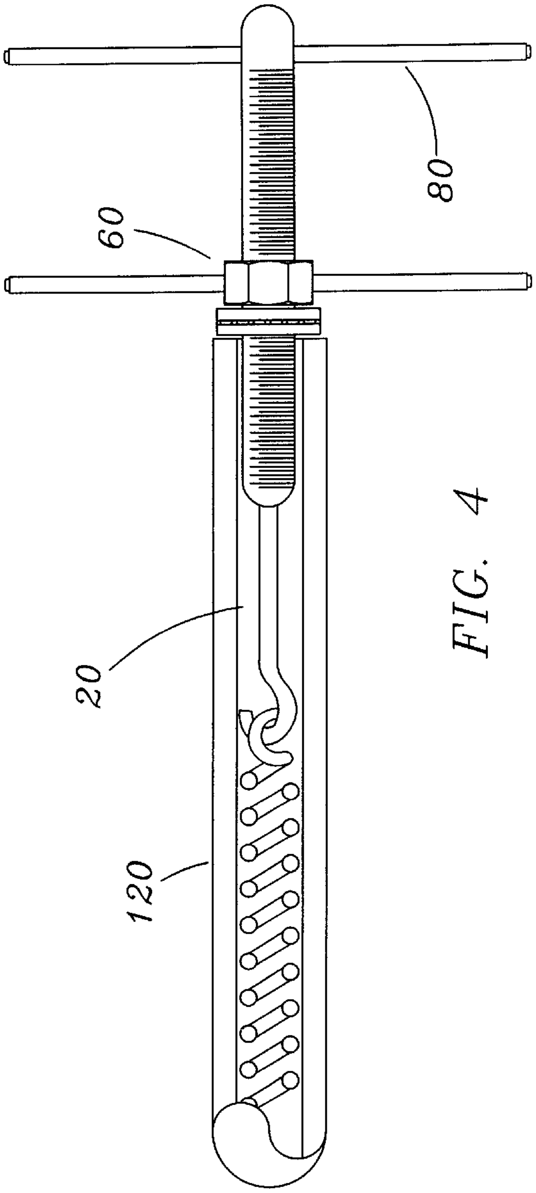
FIG. 4 is a side partial cross-sectional view, similar to that of FIG. 3 but having the simplified bearing structure illustrating the hook element in contact with the spring carried within the hanger tube.
Figure 5:
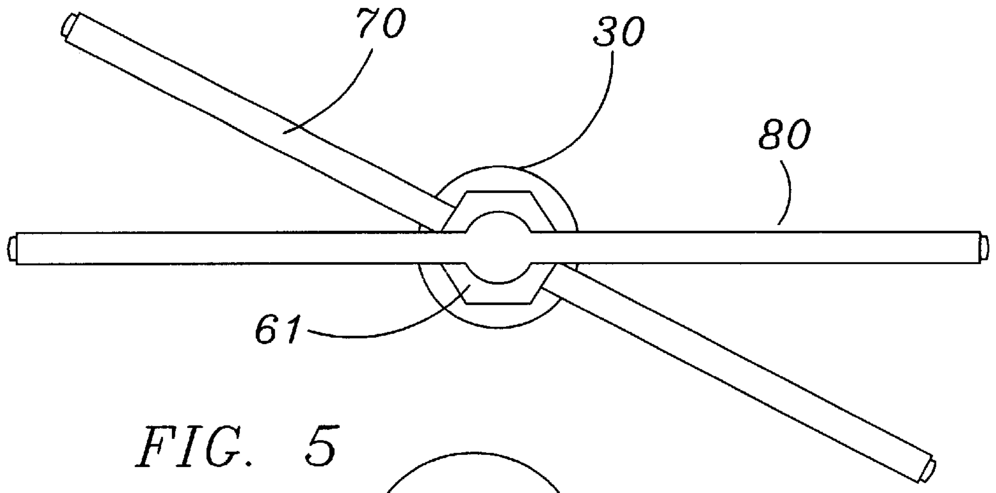
FIG. 5 is an end view of the version of the invention of FIG. 4.

As seen in FIGS. 3 and 4, a hook element 20 is sized to reach into the hanger tube 120 of the mud flap assembly 100 and to grasp the hooked end 132 of the spring 130. A preferred hook element 20 includes a hook 21 supported on a shaft 22. A drive rod attachment end 23 of the shaft is sized for insertion in a hole 32 defined in the hook element supporting end 31 of the drive rod. A screw 24 passing through a hole 33 defined in the hook element supporting end 31 or other fastener may be used to secure the hook element 20 to the drive rod 30.

Figure 2:
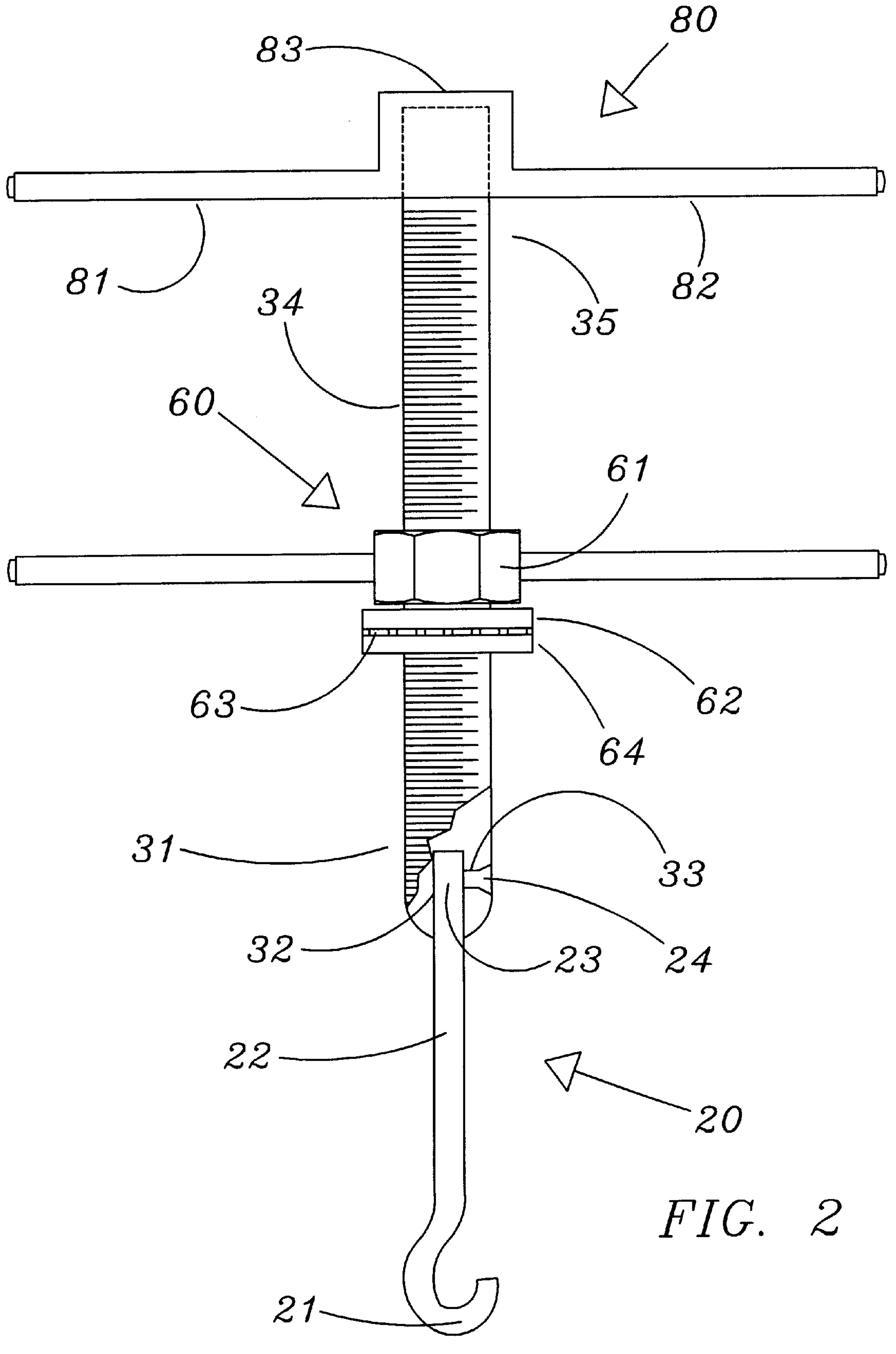
FIG. 2 is a side orthographic view of a version of the spring loaded mud flap tool having a simplified bearing structure.

As seen particularly in FIGS. 2 through 4, a drive rod 30 has an externally threaded surface 34 and is of a diameter sized to pass within the hanger tube 120. A hook element supporting end 31 of the drive rod supports the hook element 20.

A handle supporting end 35 of the drive rod supports a handle assembly 80, typically having two diametrically opposed handles. As seen in FIG. 2, the handle assembly may include a cap 83, allowing attachment of the handle assembly to the end 35 of the drive rod. Alternatively, in a more economical version of the invention seen in FIGS. 3 and 4, the handle 80 may be passed through a hole drilled in the end 35 of the drive rod.

Figure 6:
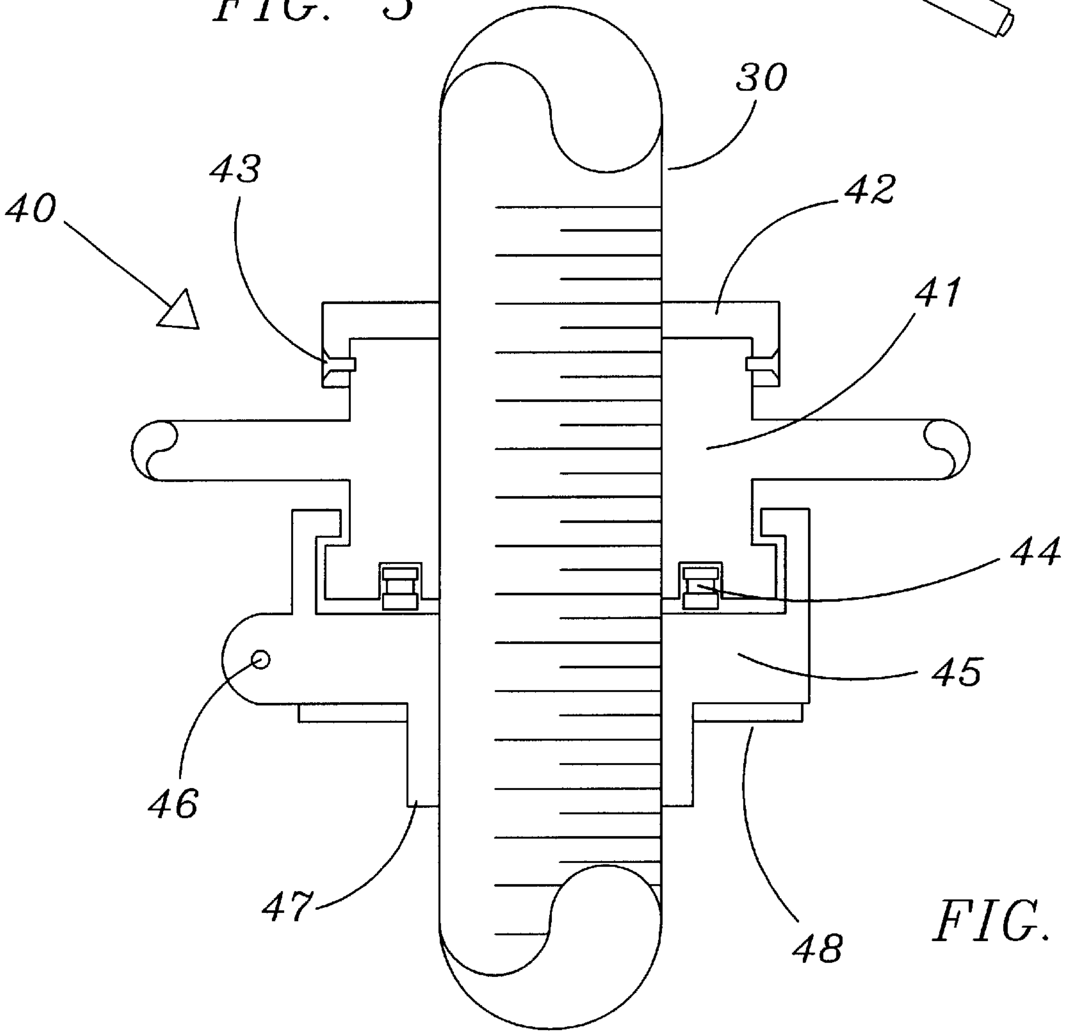
FIG. 6 is an enlarged view of the more complex bearing structure seen in FIG. 3.

As seen in FIG. 3 and particularly in FIG. 6, a preferred bearing assembly 40 is threadedly carried by the drive rod 30. A threaded body 41 is sized to thread onto the threaded surface 34 of the drive rod. Diametrically opposed crank handles 70 extend from the threaded body. An upper retainer 42 is attached by one or more screws 43 or similar fasteners to the threaded body.

A needle thrust bearing assembly 44 is carried within a race defined between the threaded body 41 and the lower retainer 45. The lower retainer defines a centralizer 47 which is sized to pass into the opening in the hanger tube 120 defined by the rim 121. A shoulder defined by the lower retainer supports a rubber washer 48, having a diameter sized to rest on the rim 121 of the open end of the hanger tube.

An eye 46, defined in a lobe extending from the lower retainer, allows attachment of a safety chain 90. The safety chain includes an S-hook 91 sized to attach to the eye 46 and an S-hook 92 sized to attach to the hole 122 defined in the hanger tube.

In operation, the rubber washer 48 carried on a lower portion of the centralizer 47 defined by the lower retainer 45 of the bearing assembly rests, without rotation, on the rim of the opening of the hanger tube of the mud flap assembly. Rotation rotation of the crank handles 70 turns the threaded body 41 within the bearing assembly. This rotation has very little frictional resistance, due to the thrust bearing assembly between the threaded body and the lower retainer. The rotation of the threaded body 41 retracts the drive rod 30, hook element 20 and the hooked end 132 of the spring 130. When sufficiently retracted, the hooked end of the spring can be secured to the retainer bolt 123 carried by the hanger tube 120.

As seen in FIGS. 2 and 4, a less complex bearing assembly 60 includes an upper race 62 and a lower race 64, separated by a layer of bearings 63. As seen in FIG. 4, where the lower race is held in a fixed position on the rim 121 of the hanger tube 120, the upper race freely rotates due to the low friction movement of the bearings.

A nut 61, having opposed crank handles 70 extending from diametrically opposite sides, is carried by the threaded surface 34 of the drive rod. In operation, manual operation of the crank handles results in rotation of the nut. As the nut moves, the upper race 62 moves with respect to the lower race. Thus, rotation of the nut causes the hook element to be extended or retracted, as the nut moves up or down on the threaded surface 34.

The handle assembly 80 allows the entire tool 10 to be maneuvered, typically for attachment of the hook 21 to the spring end 132. As seen in FIG. 2, a preferred handle assembly 80 includes a black handle 81, a red handle 82 and a cap 83. The handles are typically color-coded by a plastic coating. Use of different colors informs the user of which end of the hook 21 is open. The cap may be threaded onto the drive rod 30, or may be secured by a nut of other fastener.

As seen in FIGS. 3 and 4, a simplified handle assembly 80 includes the black and red handles 81, 82, but does not include the cap. In this version, the handle assembly is inserted through a hole defined in the end 35 of the drive rod 30.

A safety chain 90 can be used to attach the bearing assembly to the hanger tube. S-hooks 91, 92 may be used to attach the safety chain to the eye in the bearing assembly and to the hole 122 in the hanger tube 120.

In operation, the spring loaded mud flap tool 10 may be used safely release the tension of a worn spring carried within the hanger tube, and to install and tension a fresh spring. To remove the hanger tube, the bearing assembly 40 is rotated to a point in the middle of the threaded surface 34 of the drive rod 30. With the black and red handles 81, 82 horizontal, the hook 21 is inserted into the end 132 of the spring 130. While pulling slightly on the spring with the handles 80, the crank handles 70 are rotated clockwise (viewed from the handle end) until the centralizer 47 enters the hanger tube 120, and the washer 48 seats on the rim 121 of the hanger tube.

The retaining bolt 123 may be loosened, and the crank handles turned until the hook 21 supports the spring 130 and the retaining bolt may be removed. The safety chain is then attached to the eye of the bearing assembly and to the hole 122 for the retainer bolt. The bearing is then turned counter clockwise until the spring tension is released. The safety chain is then removed. The bearing assembly 40 is then turned by the crank handles 70 until the bearing assembly is adjacent to the handle assembly 80. The hook is then disengaged, and the tool 10 removed by pushing the tool into the hanger tube, tilting the hook 21 up, and removing.

The tool 10 may similarly be used to install a fresh spring in the hanger tube. The fresh spring 130 is attached to the anchor 110. The hanger tube 120 is then placed over the spring. With the bearing assembly 40 adjacent to the handle assembly 80, the hook 21 is attached to the free end 132 of the spring 130. With the handle assembly 80 horizontal, and with a slight outward force applied, the hook 21 held against the spring. The crank handles 70 are turned clockwise until the bearing assembly 40 seats on the rim 121 of the hanger tube. Slight tension is applied to the spring, and the safety chain is connected between the bearing assembly and the hole 122 of the hanger tube. The crank handles are then rotated until the spring is stretched sufficiently to attach the end 132 to the bolt 123. The safety chain is then removed, and the bolt 123 installed and tightened. The crank handles are then turned in the reverse direction, slightly, to allow the spring to rest on the bolt 123 and for the hook 21 to become free of the spring. The tool is then removed.

The previously described versions of the present invention have many advantages, including a primary advantage of providing a novel spring loaded mud flap installation tool that allows replacement of overly stretched springs within a spring loaded mud flap in a rapid and economical manner.

Another advantage of the present invention is to provide a novel spring loaded mud flap installation tool that is economical to manufacture and durable in use.

A still further advantage of the present invention is to provide a novel spring loaded mud flap installation tool that is safely operated, and which provides a safety chain which prevents the tool from rapid movement in the event that the spring retracts unexpectedly.

Although the present invention has been described in considerable detail and with reference to certain preferred versions, other versions are possible. For example, while two versions of the handle assembly. 80, and two versions of the bearing assembly 40, 60, have been disclosed, it is clear that some additional modifications could be made, while still in keeping within the scope of the invention. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A spring loaded mud flap installation tool, comprising:

(A) a hook element;

(B) a drive rod having a threaded surface and a first end supporting the hook element;

(C) a bearing assembly having a threaded body carried by the threaded surface of the drive rod;

(D) a pair of crank handles extend from diametrically opposed sides of the threaded body of the bearing assembly, whereby rotation of the crank handles rotates the bearing assembly, thereby moving the drive rod with respect to the bearing assembly;

(E) a handle assembly extending from a second end of the drive rod; and (F) a safety chain extending from the bearing assembly.

* * * * *